US012555897B2

United States Patent

(12) United States Patent
Liu et al.

(10) Patent No.: US 12,555,897 B2
(45) Date of Patent: Feb. 17, 2026

(54) DISPLAY APPARATUS AND HUMAN-COMPUTER INTERACTION APPARATUS

(71) Applicants: Beijing BOE Technology Development Co., Ltd., Beijing (CN); BOE TECHNOLOGY GROUP CO., LTD., Beijing (CN)

(72) Inventors: Zongmin Liu, Beijing (CN); Yiqun Hu, Beijing (CN); Jijing Huang, Beijing (CN); Feng Qu, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 153 days.

(21) Appl. No.: 18/703,336

(22) PCT Filed: Apr. 18, 2023

(86) PCT No.: PCT/CN2023/088817

§ 371 (c)(1),
(2) Date: Apr. 20, 2024

(87) PCT Pub. No.: WO2024/216480

PCT Pub. Date: Oct. 24, 2024

(65) Prior Publication Data

US 2025/0239759 A1 Jul. 24, 2025

(51) Int. Cl.
*H01Q 1/38* (2006.01)

(52) U.S. Cl.
CPC .................................... *H01Q 1/38* (2013.01)

(58) Field of Classification Search
None
See application file for complete search history.

(56) References Cited

U.S. PATENT DOCUMENTS

2022/0344833 A1 10/2022 Blin

FOREIGN PATENT DOCUMENTS

| | | | |
|---|---|---|---|
| CN | 209249695 | U | 8/2019 |
| CN | 111610882 | A | 9/2020 |
| CN | 114725666 | A | 7/2022 |
| JP | 2008109459 | A | 5/2008 |
| WO | WO2023033470 | A1 | 3/2023 |

*Primary Examiner* — Aneeta Yodichkas
(74) *Attorney, Agent, or Firm* — HOUTTEMAN LAW LLC

(57) ABSTRACT

A display apparatus includes a display module and an antenna module, where the display module includes a display area and an edge area; the antenna module includes a plurality of antenna units including a plurality of radiation structures and a plurality of transmission lines; the radiation structures are integrated on the display module; the radiation structures on a same side of the display area are divided into a plurality of groups arranged side by side in a second direction, and each group includes multiple radiation structures arranged side by side in a first direction; the radiation structures in adjacent groups are staggered; and each of the radiation structures is connected to one of the transmission lines; where the transmission lines are configured such that electromagnetic waves fed into the radiation structures have a same phase.

20 Claims, 9 Drawing Sheets

DISPLAY APPARATUS AND HUMAN-COMPUTER INTERACTION APPARATUS

CROSS-REFERENCE TO RELATED APPLICATION

This is a National Phase Application filed under 35 U.S.C. 371 as a national stage of PCT/CN2023/088817, filed on Apr. 18, 2023, the content of which is hereby incorporated by reference in its entirety.

TECHNICAL FIELD

The present disclosure belongs to the technical field of communications, and specifically relates to a display apparatus and a human-computer interaction apparatus.

BACKGROUND

The non-contact sensing technology plays an increasingly important role in the field of human-computer interaction, and currently, there are various methods for implementing non-contact sensing, including machine vision, ultrasound, millimeter waves, and the like. Unaffected by ambient light, with good performance in privacy protection and a wide interaction range, the sensing based on millimeter waves has become a technical and market hotspot, and the resolution of the millimeter waves is closely related to the operating frequency and the number of antenna elements. For a higher angular resolution, a most direct method is to increase the number of antenna elements, but a direct consequence thereof is higher system overhead.

SUMMARY

To solve at least one of the problems in the existing art, the present disclosure provides a display apparatus and a human-computer interaction apparatus.

An embodiment of the present disclosure provides a display apparatus, including a display module and an antenna module, wherein the display module includes a display area and an edge area; the antenna module includes a plurality of antenna units including a plurality of radiation structures and a plurality of transmission lines; the radiation structures are integrated on the display module; the radiation structures on a same side of the display area are divided into a plurality of groups arranged side by side in a second direction, and each group includes multiple radiation structures arranged side by side in a first direction; the radiation structures in adjacent groups are staggered; and each of the radiation structures is connected to one of the transmission lines; wherein the transmission lines are configured such that electromagnetic waves fed into the radiation structures have a same phase.

The transmission lines are integrated on the display module, and the transmission lines have a same length.

The transmission lines are integrated on the display module, and the radiation structures include two groups, one group closer to the display area is called a first radiation structure group, and the other group is called a second radiation structure group;

the transmission lines connected to the radiation structures in the first radiation group are called first transmission lines, each first transmission line includes a first line segment and a second line segment connected with each other, and the first line segment is connected to the corresponding radiation structure; and the first line segment extends in the second direction;

the transmission lines connected to the radiation structures in the second radiation group are called second transmission lines, and each second transmission line includes at least one third line segment extending in the first direction, and at least one fourth line segment extending in the second direction;

a length of the first line segment in the first transmission line is equal to a summed length of the third line segment in the second transmission line; and a length of the second line segment in the first transmission line is equal to a summed length of the fourth line segment in the second transmission line.

The number of third line segments and/or the number of fourth line segments differ in at least part of the second transmission lines.

Every two adjacent second transmission lines are arranged in mirror symmetry.

The first transmission lines have a same trace direction.

The second line segment includes a first line subsegment extending in the first direction, and a second line subsegment extending in the second direction.

The transmission lines are integrated on the display module, and the radiation structures include two groups, one group closer to the display area is called a first radiation structure group, and the other group is called a second radiation structure group; and the transmission lines connected to the radiation structures in the first radiation group are called first transmission lines, the transmission lines connected to the radiation structures in the second radiation group are called second transmission lines, and the first transmission lines and the second transmission lines have opposite feed directions.

Each of the radiation structures and the transmission line connected thereto form an integral structure.

The antenna module further includes an adapter plate and a printed circuit board; each transmission line includes a first portion integrated on the display module, a second portion integrated on the adapter plate, and a third portion integrated on the printed circuit board; and the first portion of the transmission line is connected to the second portion by bonding, and the second portion is connected to the third portion by bonding.

The radiation structures include two groups, one group closer to the display area is called a first radiation structure group, and the other group is called a second radiation structure group; the transmission lines connected to the radiation structures in the second radiation group are called first transmission lines, the transmission lines connected to the radiation structures in the first radiation group are called second transmission lines; and the second portion of each second transmission line includes a plurality of fifth line segments extending in the first direction, and a plurality of sixth line segments extending in the second direction; and the plurality of fifth line segments and the plurality of sixth line segments are alternately and sequentially connected.

The radiation structures include two groups, one group closer to the display area is called a first radiation structure group, and the other group is called a second radiation structure group; the transmission lines connected to the radiation structures in the second radiation group are called first transmission lines, the transmission lines connected to the radiation structures in the first radiation group are called second transmission lines; and the third portion of each first transmission line has a different length from the third portion of each second transmission line.

Each of the radiation structures includes a plurality of radiation patches connected with each other and arranged side by side in the first direction.

Each of the radiation structures includes a plurality of radiation patches connected with each other and arranged side by side in the second direction.

Each of the radiation structures includes a plurality of radiation patches connected with each other; and the radiation patches in respective radiation structures are divided into a plurality of groups arranged side by side in the second direction, each of which includes multiple radiation patches arranged side by side in the first direction, and the radiation patches in adjacent groups are staggered.

The antenna module includes a radiation layer, the radiation layer covers the display module and includes a mesh structure, and the radiation structures are in the radiation layer.

An embodiment of the present disclosure provides a human-computer interaction apparatus, including any display apparatus as described above.

The display module includes a data processing module and a displaying module;

a data processing module configured to determine, according to a radar signal transmitted from the antenna module and a received echo signal, a body action and a corresponding control instruction, and output the control instruction; and the displaying module is configured to display the determined body action and/or control instruction.

The data processing module includes a first processing core and a second processing core;

the first processing core is configured to perform analytic operation according to a signal obtained by mixing the radar signal and the echo signal, to generate reflection object information, wherein the analytic operation includes at least one of one-dimensional fast Fourier transformation, two-dimensional fast Fourier transformation, or angle of arrival calculation; and the second processing core is configured to perform chirp control on the radar signal, pre-train and generate a body action recognition network, recognize the body action by the body action recognition network according to the reflection object information, and determine the corresponding control instruction.

The data processing module includes a low noise amplifier, a mixer, an intermediate frequency amplifier, an analog-to-digital converter, a digital front-end component, a buffer, a power amplifier, a power divider, and a waveform generator;

wherein the low noise amplifier, the mixer, the intermediate frequency amplifier, the analog-to-digital converter, the digital front-end component and the buffer are connected in sequence;

the waveform generator, the power divider and the power amplifier are connected in sequence; and an input of the mixer is further connected to the power divider, an input of the low noise amplifier is connected to the array antenna, and an output of the power amplifier is connected to the antenna module.

The human-computer interaction apparatus includes any one of a smart home device, a vehicle-mounted device, a health monitoring device, or a consumer electronic device.

DETAIL DESCRIPTION OF EMBODIMENTS

To improve understanding of the technical solution of the present disclosure for those skilled in the art, the present disclosure will be described in detail with reference to accompanying drawings and specific implementations.

Unless otherwise defined, technical or scientific terms used in the present disclosure are intended to have general meanings as understood by those skilled in the art to which the present disclosure belongs. The words "first", "second" and similar terms used in the present disclosure do not denote any order, quantity, or importance, but are used merely for distinguishing different components from each other. Likewise, the words "a", "an", or "the" and similar referents do not denote a limitation of quantity, but rather denote the presence of at least one. The word "comprising" or "including" or the like means that the element or item preceding the word contains elements or items that appear after the word or equivalents thereof, but does not exclude other elements or items. The terms "connected" or "coupled" and the like are not restricted to physical or mechanical connections, but may include electrical connections, whether direct or indirect. The words "upper", "lower", "left", "right", and the like are merely used to indicate a relative positional relationship, and when an absolute position of the described object is changed, the relative positional relationship may be changed accordingly.

Figure 1:
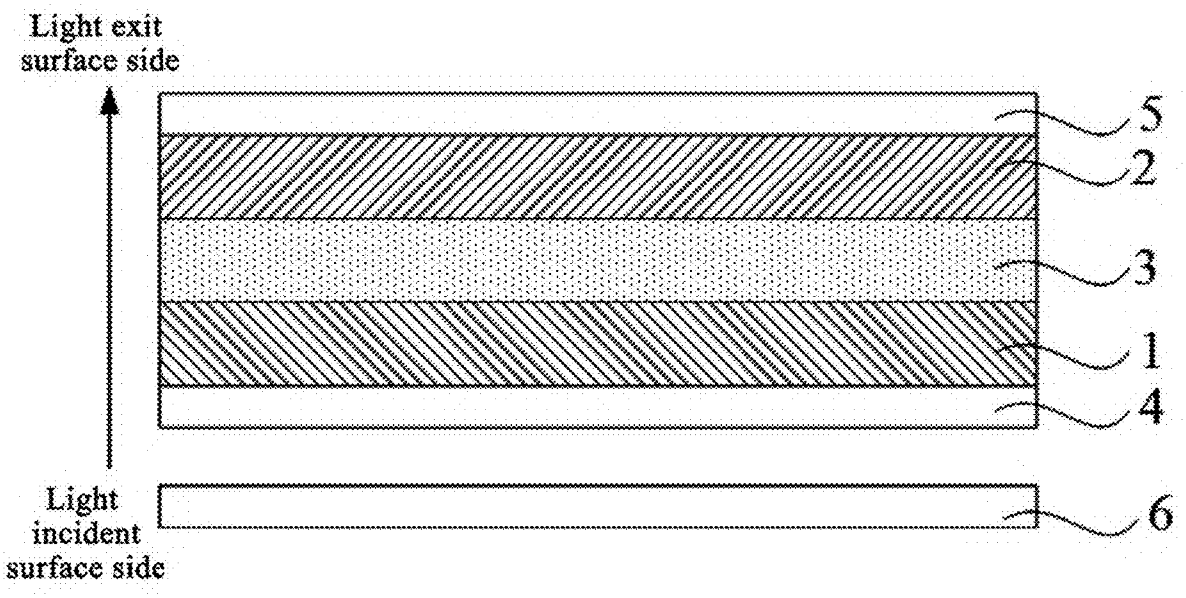
FIG. 1 is a schematic diagram of an exemplary liquid crystal display apparatus.
Figure 2:
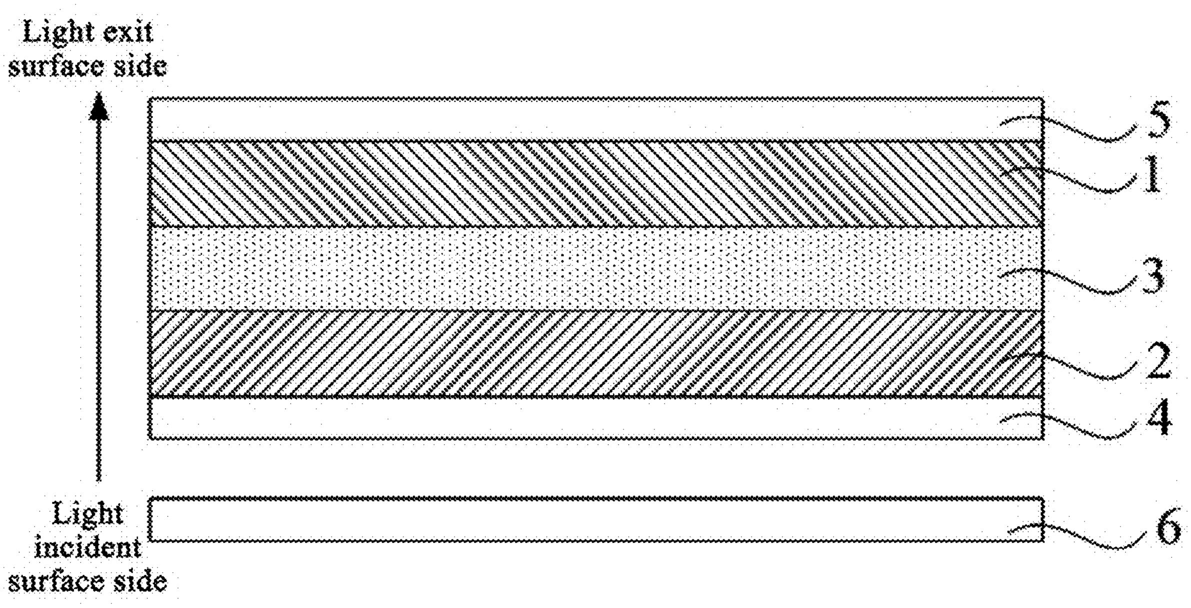
FIG. 2 is a schematic diagram of another exemplary liquid crystal display apparatus.

FIG. 1 is a schematic diagram of an exemplary liquid crystal display apparatus; and FIG. 2 is a schematic diagram of another exemplary liquid crystal display apparatus. As shown in FIGS. 1 and 2, the display apparatus may be specifically a liquid crystal display apparatus, including a display module, a backlight module 6 on a light incident surface side of the display module, a first polarizer 4 on the light incident surface side of the display module, and a second polarizer 5 between the display module and the backlight module 6.

Figure 3:
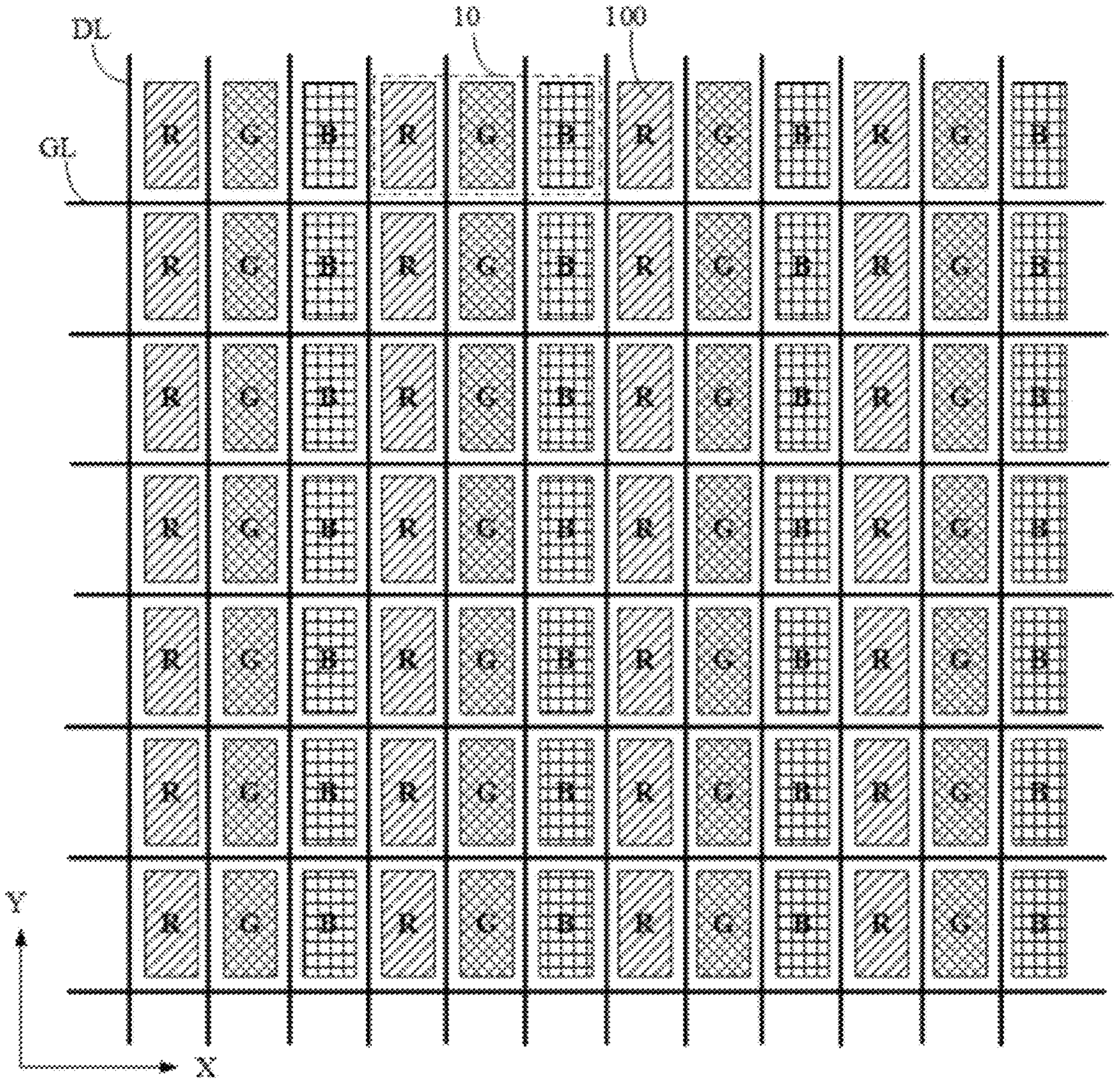
FIG. 3 is a schematic diagram of a pixel arrangement in an exemplary liquid crystal display apparatus.

FIG. 3 is a schematic diagram of a pixel arrangement in an exemplary liquid crystal display apparatus. As shown in FIG. 3, the display module is divided into a plurality of pixel units, where each pixel unit 10 includes a plurality of subpixels 100. In the embodiments of the present disclosure, a case where the subpixels 100 in each pixel unit 10 include, for example, a red subpixel R, a green subpixel G, and a blue subpixel B is taken as an example for illustration. The subpixels 100 in the pixel units 10 arranged side by side in a first direction X are arranged based on the same rule. For example: the subpixels 100 in a first row of pixel units 10 are arranged (from left to right) in an order of red subpixel R, green subpixel G and blue subpixel B, while the subpixels 100 in a second row of pixel units 10 are arranged (from left to right) in an order of green subpixel G, blue subpixel B and red subpixel R. With continued reference to FIG. 3, in such a pixel structure, the subpixels 100 arranged side by side in a second direction Y have the same color. For example: the subpixels 100 arranged side by side in the second direction Y are all red subpixels R.

It should be noted that the color of each subpixel 100 depends on a color of a color filter in the subpixel 100. If the color filter in the subpixel 100 is red, the subpixel 100 is called a red subpixel R. Similarly, if the color filter in the subpixel 100 is green, the subpixel 100 is called a green subpixel G, and if the color filter in the subpixel 100 is blue, the subpixel 100 is called a blue subpixel B.

Figure 4:
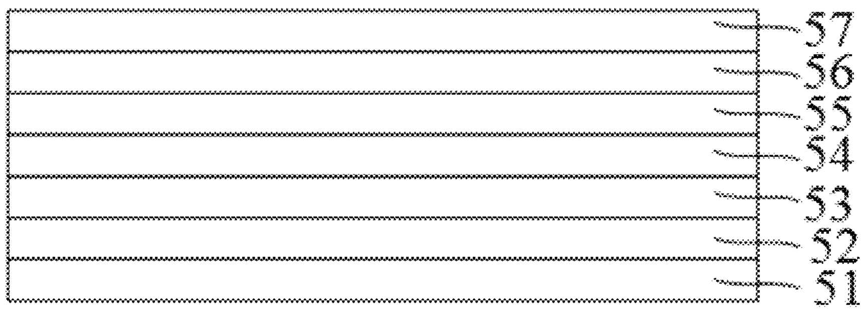
FIG. 4 is a schematic diagram of an exemplary first polarizer.

The display module includes a first substrate and a second substrate disposed opposite to each other, and a liquid crystal layer 3 arranged between the first substrate and the second substrate. One of the first substrate and the second substrate is an array substrate 1, and the other of the first substrate and the second substrate is a color filter substrate 2. The first polarizer 4 and the second polarizer 5 may practically have the same film layer structure. FIG. 4 is a schematic diagram of an exemplary first polarizer 4. As shown in FIG. 4, the first polarizer 4 includes a release film 51, an adhesive layer 52, a first support layer 53, a polarization layer 54, a second support layer 55, a low reflection layer 56, and a protective layer 57 arranged in a stack. In this case, the release film 51 of the first polarizer 4 is peeled off so that the adhesive layer 52 may be bonded to the first substrate. Similarly, when the second polarizer 5 has the same structure as the first polarizer 4, the release film 51 of the second polarizer 5 may also be peeled off so that the adhesive layer 52 may be bonded to the second substrate.

Figure 5:
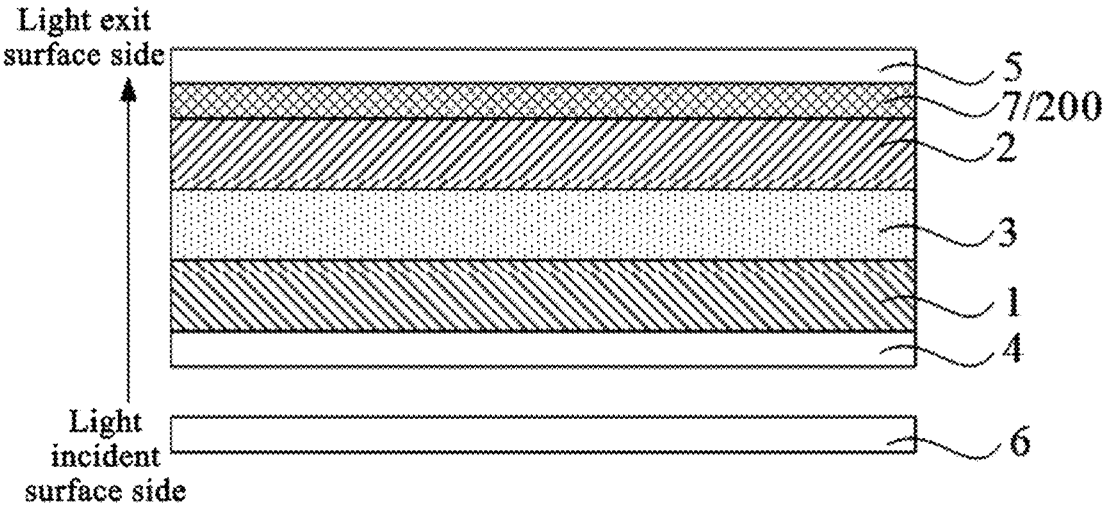
FIG. 5 is a schematic diagram of a display apparatus according to an embodiment of the present disclosure.

FIG. 5 is a schematic diagram of a display apparatus according to an embodiment of the present disclosure. As shown in FIG. 5, according to the antenna radiation theory and in combination with the structures in the display apparatus, an external antenna scheme that can be easily implemented is providing an antenna module between the display module and the first polarizer. Each antenna unit in the antenna module may include a transmitting antenna and a receiving antenna. The antenna unit in the antenna module may be a transceiving antenna. The display module has a display area and a peripheral area surrounding the display area, and the antenna unit is located in the peripheral area.

Figure 6:
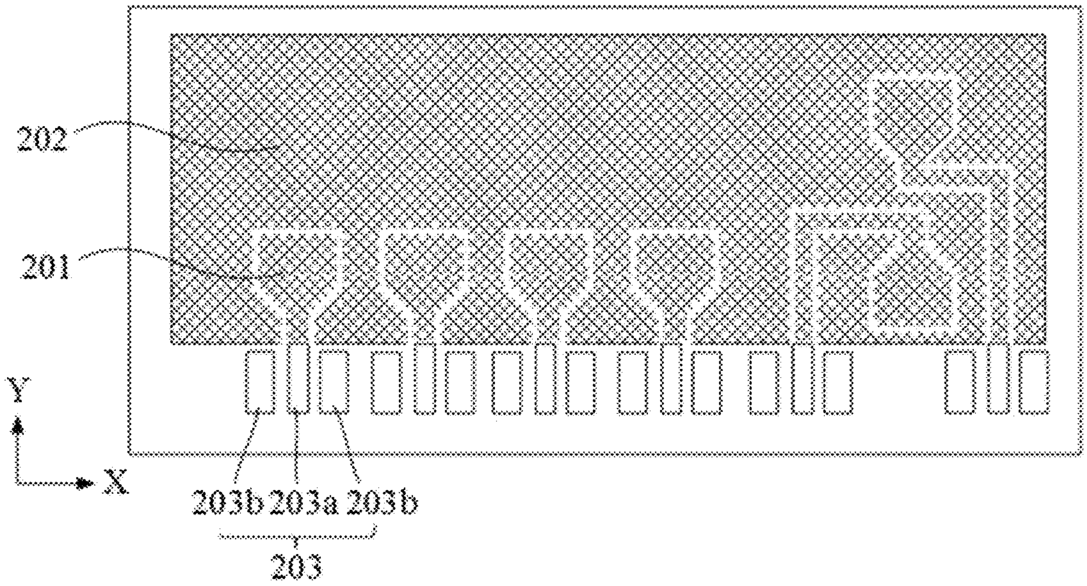
FIG. 6 is a top view of a radiation layer in a display apparatus according to an embodiment of the present disclosure.
Figure 7:
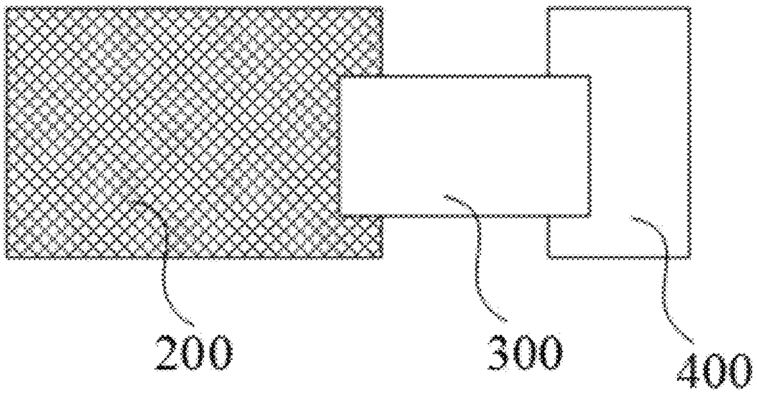
FIG. 7 is a schematic diagram showing feeding of a radiation layer in a display apparatus according to an embodiment of the present disclosure.

FIG. 6 is top view of a radiation layer in a display apparatus according to an embodiment of the present disclosure; and FIG. 7 is a schematic diagram showing feeding of a radiation layer in a display apparatus according to an embodiment of the present disclosure. As shown in FIGS. 6 and 7, the antenna unit includes not only a radiation structure 201 and a first reference electrode, but also a feed structure. The feed structure may include a transmission line 203 which is, for example, a coplanar waveguide (CPW) transmission line. Specifically, the transmission line 203 includes a signal electrode **203*a*, and second reference electrodes 203*b* on both sides of an extending direction of the signal electrode 203*a*. The signal electrode 203*a* may be electrically connected to the radiation structure 201 through a first feeder line. It should be noted that although the feed structure being a CPW transmission line 203 is taken as an example for illustration in the embodiments of the present disclosure, it will be appreciated that the feed structure is not limited thereto, and the CPW transmission line 203** does not constitute any limitation to the type of the feed structure in the embodiments of the present disclosure.

In some examples, the antenna module in the embodiments of the present disclosure includes a radiation layer integrated on the display module. The radiation layer 200 covers the display module and includes a mesh structure, and the radiation structure 201 is located in the radiation layer. For example: the radiation layer 200 includes first conductive lines 301 and second conductive lines 302 arranged crosswise; and in the conductive mesh structure, extending directions of the first conductive lines 301 and the second conductive lines 302 may be perpendicular to each other, so that square or rectangular hollowed-out portions are formed. Apparently, in the conductive mesh structure, the extending directions of the first conductive lines 301 and the second conductive lines 302 may be not perpendicular to each other. For example: the extending directions of the first conductive lines 301 and the second conductive lines 302 form an angle of 63°, so that diamond hollowed-out portions are formed. It should be noted that a portion of the radiation layer 200 in the display area is a redundant radiation structure 202. A metal mesh of the redundant radiation structure 202 is broken around each intersection.

In some examples, the first conductive lines 301 and the second conductive lines 302 in the conductive mesh structure are preferably have the same line width, same line thickness and same line spacing, but apparently, different line widths, different line thicknesses and different line spacings are also possible. For example: with continued reference to FIG. 9, the first conductive lines 301 and the second conductive lines 302 each have a line width W1 of about 1 μm to 30 μm, a line spacing W2 of about 50 μm to 250 μm, and a line thickness of about 0.5 μm to 10 μm. In some examples, the conductive mesh structure is made of a material including a metal, such as copper, silver, aluminum, or any other metal material.

Further, as shown in FIG. 7, the display apparatus in this example includes not only the above structures, but also a flexible adapter plate 300 and a printed circuit board 400. The flexible adapter plate 300 is configured to enable transmission of radio frequency signals between the transmission line 203 and the printed circuit board 400. For example: the transmission line 203 is connected to the flexible adapter plate 300 by bonding, and the printed circuit board 400 is also connected to the flexible adapter plate 300 by bonding. Where the transmission line 203 is connected to the flexible adapter board by bonding, and the printed circuit board 400 is connected to the flexible adapter plate 300 by bonding, each conductive gold ball in the adopted conductive optical clear adhesive (ACF) has a diameter greater than 10 μm, thereby achieving lower signal loss.

Figure 8:
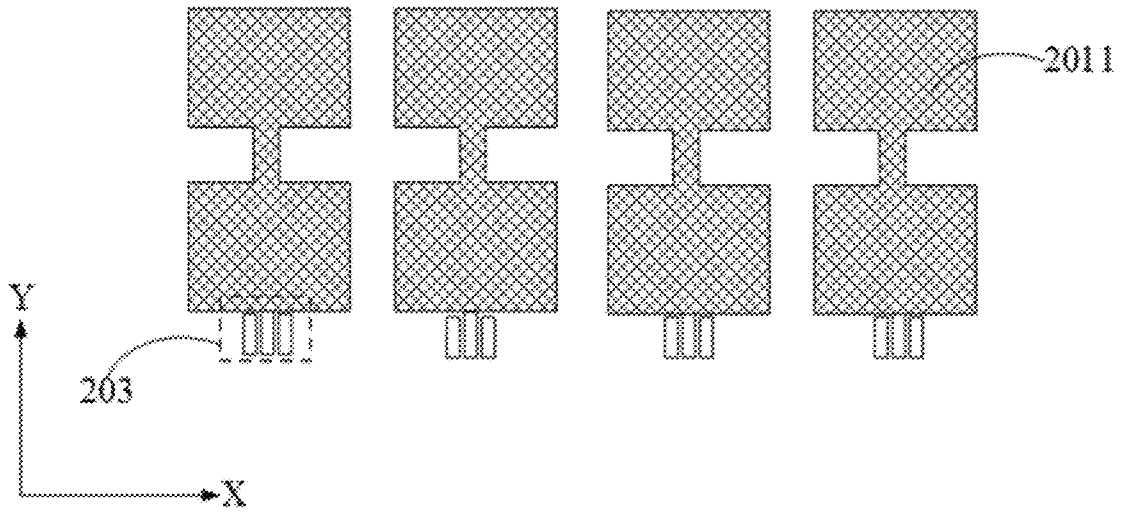
FIG. 8 is a top view of another radiation layer in a display apparatus according to an embodiment of the present disclosure.
Figure 9:
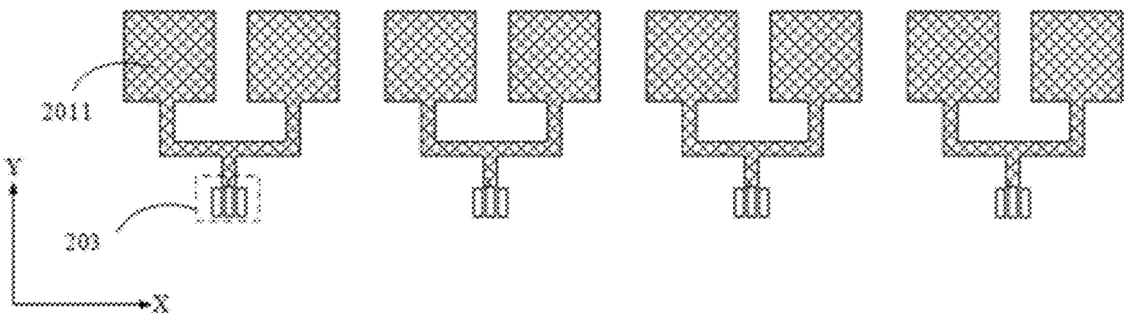
FIG. 9 is a top view of another radiation layer in a display apparatus according to an embodiment of the present disclosure.

In some examples, FIG. 8 is a top view of another radiation layer in a display apparatus according to embodiments of the present disclosure. As shown in FIG. 8, the radiation structure 201 includes a plurality of radiation patches 2011 connected with each other and arranged side by side in the first direction X. In other words, the radiation structure 201 includes a plurality of radiation patches 2011 that are serially fed, so that the radiation area and the gain can be increased. Similarly, FIG. 9 is a top view of another radiation layer in a display apparatus according to embodiments of the present disclosure. As shown in FIG. 9, the radiation patches 2011 in the radiation structure 201 may be arranged side by side in the second direction Y.

Figure 10:
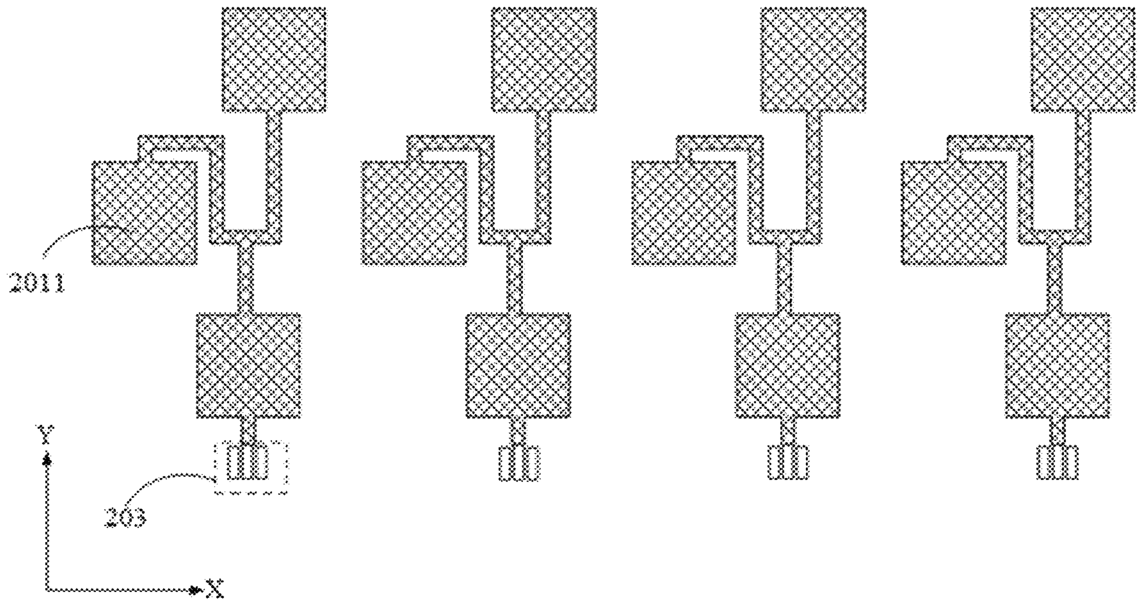
FIG. 10 is a top view of another radiation layer in a display apparatus according to an embodiment of the present disclosure.

In some examples, FIG. 10 is a top view of another radiation layer in a display apparatus according to embodiments of the present disclosure. As shown in FIG. 10, the radiation structure 201 includes a plurality of radiation patches 2011 connected with each other. The radiation patches 2011 in respective radiation structures 201 are divided into a plurality of groups arranged side by side in the second direction Y, each of which includes a plurality of radiation patches 2011 arranged side by side in the first direction X, and the radiation patches 2011 in adjacent groups are staggered. Adjacent radiation patches 2011 staggered have a spacing λ/2 in the second direction Y. Simulation has proved that the phenomenon that a gain of an intermediate antenna unit is reduced due to the influence of adjacent antenna units is relieved, the gains among the antennas are almost consistent, with a difference less than 0.1 dB.

Figure 11:
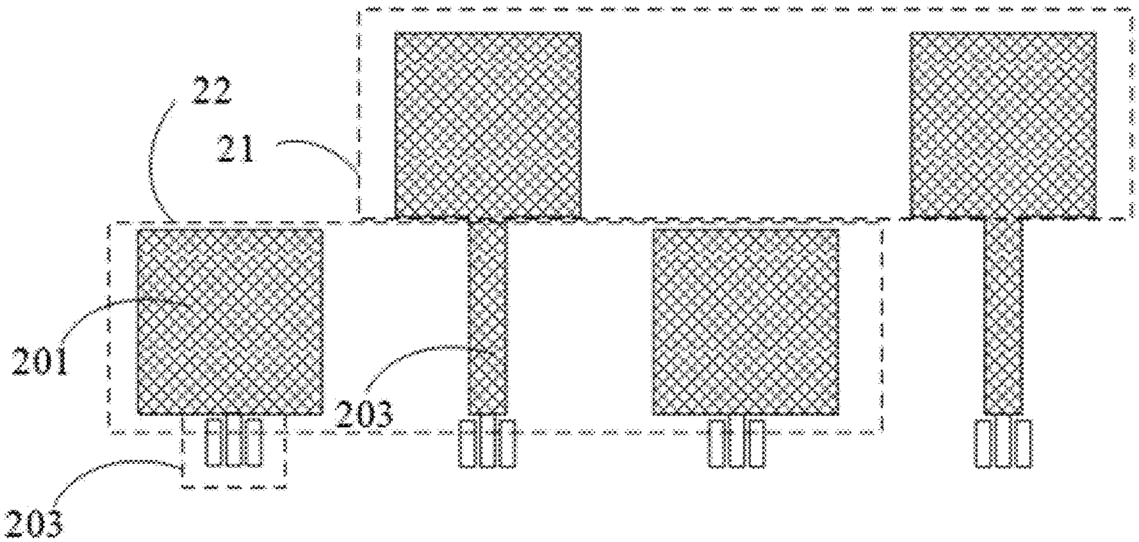
FIG. 11 is a top view of another radiation layer in a display apparatus according to an embodiment of the present disclosure.

FIG. 11 is a top view of another radiation layer in a display apparatus according to an embodiment of the present disclosure. Referring to FIG. 11, taking the antenna units being transceiving antennas as an example, each antenna unit includes a transmission line 203 integrated with and electrically connected to the radiation structure 201, and the transmission line 203 is configured to feed the radiation structure 201. The radiation structures 201 in the antenna units on a side of the display area are divided into a plurality of groups arranged side by side in the second direction Y, each of which includes a plurality of radiation structures arranged at intervals in the first direction X and staggered with an adjacent group of radiation structures 201. FIG. 11 shows the example of an antenna module including two groups of radiation structures 201, and for convenience of description, one of the groups closer to the display area is referred to as a first radiation structure group 21, and the other of the groups is referred to as a second radiation structure group 22. The transmission lines 203 connected to the radiation structures 201 in the first radiation structure group 211 are referred to as first transmission lines 2031, and the transmission lines 203 connected to the radiation structures 201 in the second radiation structure group 22 are referred to as second transmission lines 2032. The radiation structures 201 in the first radiation structure group 21 and the radiation structures 201 in the second radiation structure group 22 have a spacing of λ/2 in the second direction Y. The radiation structures 201 staggered lead to different transmission paths of electromagnetic wave signals, which in turn causes a phase difference added to a spatial phase difference and thus affects estimation of an angle of arrival, which is calculated by:

$$\theta = \sin^{1}\left(\frac{\lambda\omega}{2\pi d}\right);$$

where λ represents a wavelength of the electromagnetic wave signal, d represents a spacing between adjacent radiation structures 201 in the first direction X, and ω is a radian representation of the spatial phase difference. The radiation structures 201 staggered introduce an additional half-wavelength transmission phase difference, i.e., 180°, and therefore, the transmission paths are compensated. However, the transmission paths depend on the transmission lines 203. The following are several solutions for compensating the transmission paths in part of the antenna units to compensate for the phase difference of the electromagnetic waves radiated by the respective radiation structures 201.

It should be noted that although the following examples only take the case where the first radiation structure group 21 and the second radiation structure group 22 each include two radiation structures 201 as an example for illustration, it should be understood that the number of radiation structures 201 in the first radiation structure group 21 and the second radiation structure group 22 is not limited to two, and may be specifically designed according to the specific application scenario.

Figure 12:
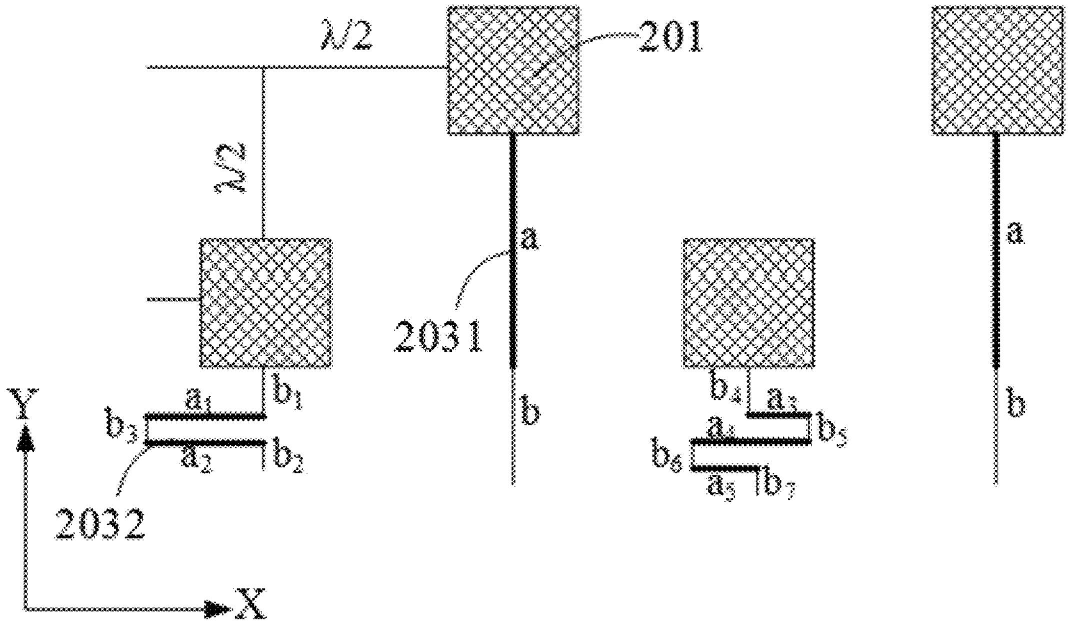
FIG. 12 is a schematic diagram showing a connection of a radiation structure and a transmission line in a first example according to an embodiment of the present disclosure.

First example: FIG. 12 is a schematic diagram of a connection of a radiation structure 201 and a transmission line 203 in a first example of an embodiment of the present disclosure; As shown in FIG. 12, the first transmission lines 2031 electrically connected to the radiation structures 201 in the first radiation structure group 21, and the second transmission lines 2032 electrically connected to the radiation structures 201 in the second radiation structure group 22, are integrated on the display module. Each first transmission line 2031 includes a first line segment and a second line segment, where one end of the first line segment is connected to the first radiation structure 201, and the other end of the first line segment is connected to the second line segment. Each second transmission line 2032 includes a third line segment extending in the first direction X, and a fourth line segment extending in the second direction Y. One or more third line segments and one or more fourth line segments may be provided, and the third line segments and the fourth line segments are alternately connected to form the second transmission line 2032.

Specifically, referring to FIG. 12, one of the second transmission lines 2032 includes two third line segments and three fourth line segments, while another second transmission line 2032 includes three third line segments and four fourth line segments. The first line segment in the first transmission line 2031 has a length of $\lambda/2$ transmission path, and the second line segment serves as a compensation transmission path. The third line segments in the second transmission line 2032 have a summed length of $\lambda/2$ transmission path, and a summed length of the fourth line segments serves as a compensation transmission path. In this example, the first transmission line 2031 and the second transmission line 2032 have the same length, so as to compensate for the phase difference of the electromagnetic waves radiated by the respective radiation structures 201. The length of the first line segment in the first transmission line 2031 is denoted by a, and the length of the second line segment is denoted by b. The lengths of the two third line segments in the one second transmission line 2032 are denoted by a1 and a2, respectively, and the lengths of the three fourth line segments are denoted by b1, b2 and b3, respectively. The lengths of the three third line segments in the another second transmission line 2032 are denoted by a3, a4 and a5, respectively, and the lengths of the four fourth line segments are denoted by b4, b5, b6 and b7, respectively. In this case, $a+b=a1+a2+b1+b2+b3=a3+a4+a5+b4+b5+b6+b7$, which enables the same transmission path in the respective antenna units.

Figure 13:
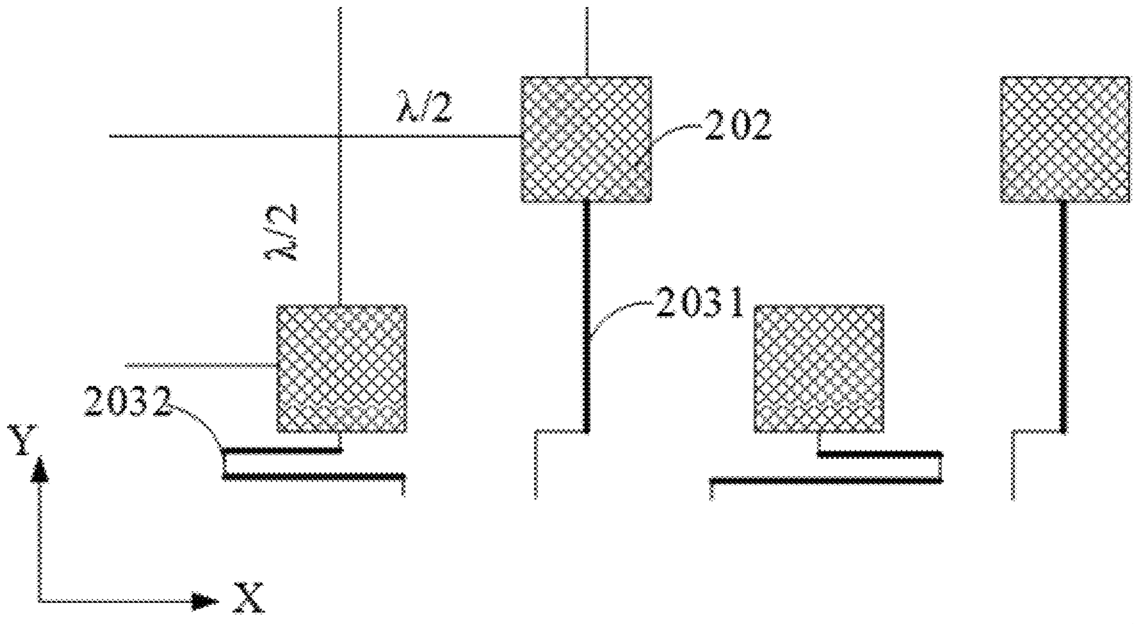
FIG. 13 is a schematic diagram showing another connection of a radiation structure and a transmission line in a first example according to an embodiment of the present disclosure.

FIG. 12 shows only one arrangement manner of the first transmission lines 2031 and the second transmission lines 2032, FIG. 13 is a schematic diagram showing another connection of a radiation structure 201 and a transmission line 203 in a first example according to an embodiment of the present disclosure, and the first transmission lines 2031 and the second transmission lines 2032 may also be arranged in the manner shown in FIG. 13. Specifically, compared with the second line segment in the first transmission line 2031 extending in the second direction Y, a meandering line of the second line segment in the first transmission line 2031 of FIG. 13 may be formed by alternately connecting a first line subsegment extending in the first direction X and a second line subsegment extending in the second direction Y. Every two adjacent first transmission lines 2031 are arranged in mirror symmetry, and every two adjacent second transmission lines 2032 are arranged in mirror symmetry.

Although two exemplary manners of integrating the transmission lines 203 on the display module are given above, and the transmission lines 203 are designed such that the transmission paths of the antenna units have the same structure, it should be understood that it is feasible as long as the length of the first line segment in the first transmission line 2031 and the summed length of the third line segments in the second transmission line 2032 are both $\lambda/2$, and the length of the second line segment in the first transmission line 2031 is equal to a summed length of the fourth line segments in the second transmission line 2032, which are not listed here one by one.

Figure 14:
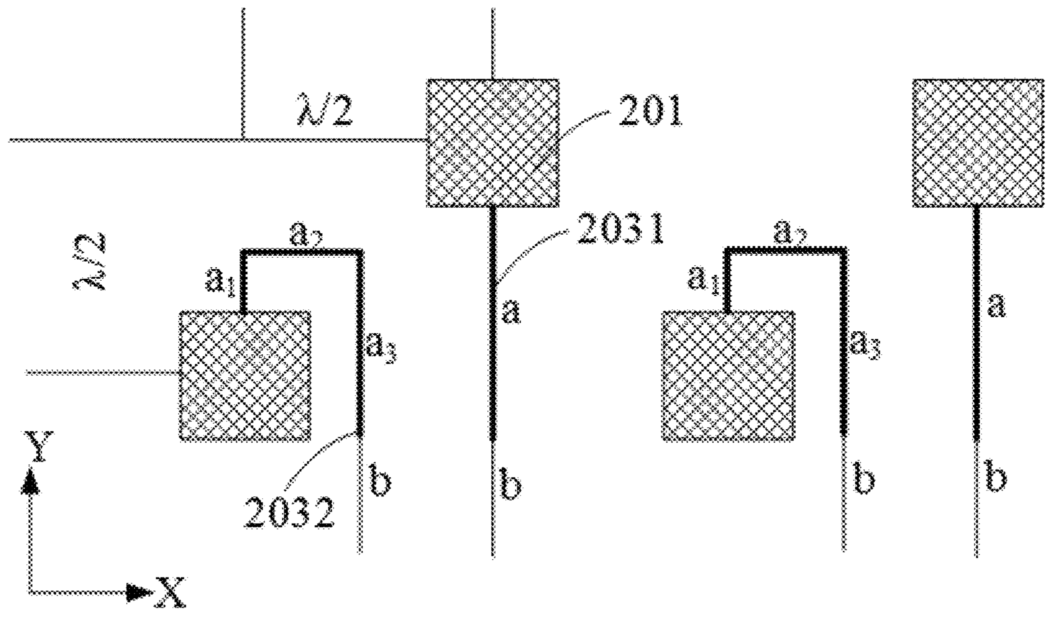
FIG. 14 is a schematic diagram showing a connection of a radiation structure and a transmission line in a second example according to an embodiment of the present disclosure.

Second example: FIG. 14 is a schematic diagram of a connection of a radiation structure 201 and a transmission line 203 in a second example of an embodiment of the present disclosure. As shown in FIG. 14, this example is substantially the same as the first example, where the first transmission line 2031 and the second transmission line 2032 are also integrated on the display module, except that the first transmission line 2031 and the radiation structure 201 corresponding thereto are connected together at a different position from the second transmission line 2032 and the radiation structure 201 corresponding thereto. Specifically, the radiation structure 201 includes a first side and a second side disposed opposite to each other in the second direction Y, the first transmission line 2031 is connected to the first side of the radiation structure 201 corresponding thereto, and the second transmission line 2032 is connected to the second side of the radiation structure 201 corresponding thereto. In addition, a connection node between the first transmission line 2031 and the radiation structure 201 corresponding thereto is called a first node, which is further connected to a center of the radiation structure 201 to form a first connection line segment, while a connection node between the second transmission line 2032 and the radiation structure 201 corresponding thereto is called a second node, which is further connected to a center of the radiation structure 201 to form a second connection line segment. The first connection line segment and the second connection line segment have the same extending direction. In this case, the first transmission line 2031 and the second transmission line 2032 transmit opposite electromagnetic waves.

In this example, the first transmission line 2031 includes a first line segment and a second line segment, where one end of the first line segment is connected to the radiation structure 201, and the other end of the first line segment is connected to the second line segment. The second transmission line 2032 includes a third line segment and a fourth line segment, where one end of the third line segment is connected to the radiation structure 201, and the other end of the third line segment is connected to the fourth line segment. The second line segment of the first transmission line 2031 and the fourth line segment of the second transmission line 2032 have the same extending direction (e.g., the second direction Y) and the same length. Since the first transmission line 2031 and the second transmission line 2032 transmit opposite electromagnetic waves, the length of the first line segment in the first transmission line 2031 is twice the length of the third line segment in the second transmission line 2032.

Third example: The antenna module includes not only the radiation structures 201, the transmission lines 203 and the feed structure described above, but also an adapter plate and a printed circuit board. The feed structure is integrated on the printed circuit board. Each transmission line 203 includes a first portion integrated on the display module, a second portion integrated on the adapter plate, and a third portion integrated on the printed circuit board. The first portion of the transmission line 203 is connected to the second portion by bonding, and the second portion is connected to the third portion by bonding. In other words, the first transmission line 2031 and the second transmission line 2032 each include a first portion, a second portion and a third portion. In this example, the second portion of the second transmission line 2032 is designed such that a phase difference caused by the staggered arrangement of the radiation structures 201 is compensated. According to the phase difference to be compensated, a length l of the transmission path to be compensated is determined by:

$$l = \frac{c}{2 \times f \times \sqrt{\varepsilon_{lcp} \cdot \mu_{lcp}}}.$$

Figure 15:
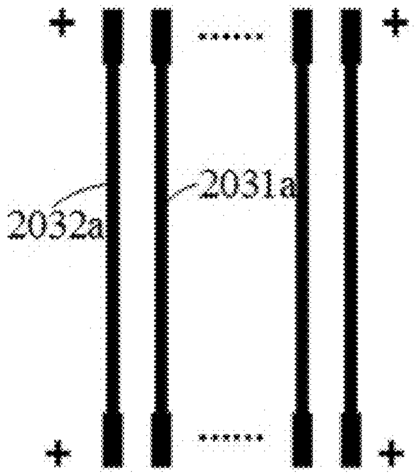
FIG. 15 is a partial structural diagram of an uncompensated transmission line in a third example according to an embodiment of the present disclosure.
Figure 16:
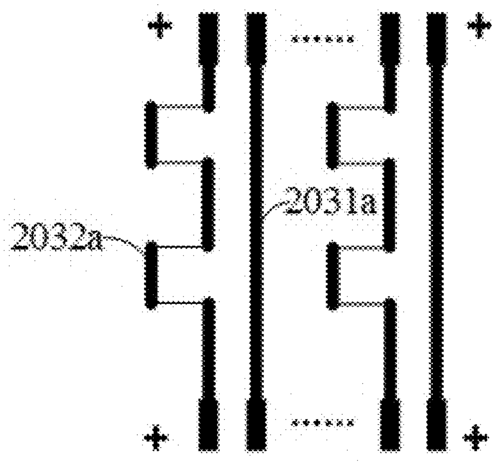
FIG. 16 is a partial structural diagram of a compensated transmission line in the third example according to an embodiment of the present disclosure.

Specifically, FIG. 15 is a partial structural diagram of an uncompensated transmission line 203 in a third example according to an embodiment of the present disclosure; and FIG. 16 is a partial structural diagram of a compensated transmission line 203 in the third example according to an embodiment of the present disclosure. As shown in FIGS. 15 and 16, the second portion 2032*a* of each second transmission line 2032 includes a plurality of fifth line segments extending in the first direction X, and a plurality of sixth line segments extending in the second direction Y; and the plurality of fifth line segments and the plurality of sixth line segments are alternately and sequentially connected. A summed length of the sixth line segments in the second transmission line 2032 is equal to a length of a second portion 2031*a* of the first transmission line 2031, and a summed length of the fifth line segments in the second transmission line 2032 is the calculated length l of the transmission path to be compensated.

Fourth example: This example is substantially the same as the third example, except that a length of the third portion of the second transmission line 2032 is adjusted in this example to compensate for the phase difference caused by the staggered arrangement of the radiation structures 201. According to the phase difference to be compensated, a length l of the transmission path to be compensated is determined by:

$$l = \frac{c}{2 \times f \times \sqrt{\varepsilon_{pcb} \cdot \mu_{pcb}}}.$$

Figure 17:
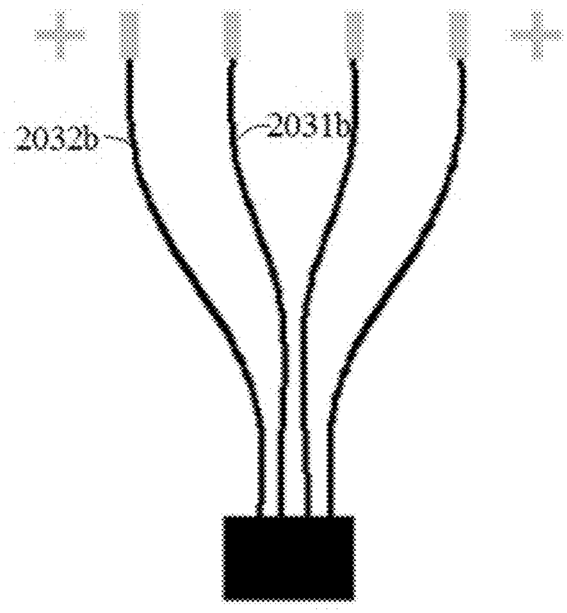
FIG. 17 is a partial structural diagram of an uncompensated transmission line in a fourth example according to an embodiment of the present disclosure.
Figure 18:
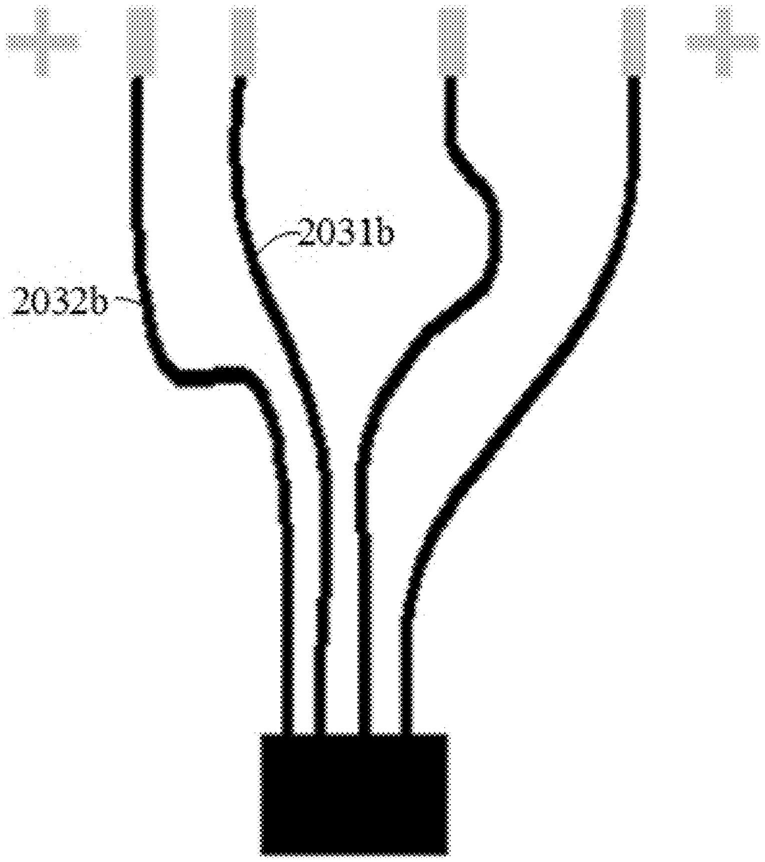
FIG. 18 is a partial structural diagram of a compensated transmission line in the fourth example according to an embodiment of the present disclosure.

Based on the calculated length l of the transmission path to be compensated, the length of the third portion of the second transmission line 2032 is adjusted such that a third portion 2031*b* of the first transmission line 2031 has a different length from a third portion 2032*b* of the second transmission line 2032, and such that electromagnetic waves radiated by the radiation structures 201 have the same phase, as shown in FIGS. 17 and 18, where FIG. 17 is a partial structural diagram of an uncompensated transmission line in a fourth example according to an embodiment of the present disclosure; and FIG. 18 is a partial structural diagram of a compensated transmission line in the fourth example according to an embodiment of the present disclosure.

The above merely shows a few exemplary structures for compensating for the phase difference in the electromagnetic waves radiated by the radiation structures 201 caused by the different transmission paths resulting from the staggered arrangement of the radiation structures 201, and in actual products, more than one of the first portion, the second portion, and the third portion of the transmission line 203 may be designed to compensate for the phase difference, as long as the summed compensation corresponds to the phase difference.

In some examples, the portion of the transmission line integrated on the display module may be located in the radiation layer, and form an integral structure with the radiation structure connected thereto. This contributes to a lightweight design of the display apparatus.

Figure 19:
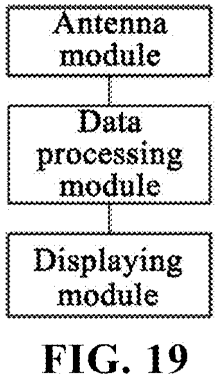
FIG. 19 is a schematic diagram of a human-computer interaction apparatus according to an embodiment of the present disclosure.

In a second aspect, FIG. 19 is a schematic diagram of a human-computer interaction apparatus according to an embodiment of the present disclosure. As shown in FIG. 19, an embodiment of the present disclosure further provides a human-computer interaction apparatus, including the antenna module as described above, a data processing module, and a displaying module. Specifically, a transmitting element in the antenna module is configured to transmit a radar signal, and a receiving element is configured to receive a reflected echo signal. The data processing module is configured to determine, according to the radar signal and the echo signal, a body action and a corresponding control instruction, and output the control instruction. The displaying module is configured to display the determined body action and/or control instruction.

In some examples, the data processing module is specifically configured to mix and analyze the radar signal and the echo signal, to obtain reflection object information, and recognize a body action according to the reflection object information and determine a corresponding control instruction. The reflection object information includes at least one of distance information, speed information, or angle of arrival information. In some embodiments, the radar signal is a Frequency Modulated Continuous Wave (FMCW) signal.

Specifically, according to the types of the transmitted signals, millimeter wave radars are divided into two categories, namely pulse radars and continuous wave radars, where the pulse radars transmit periodic high-frequency pulses, and the continuous wave radars transmit continuous wave signals. The continuous wave signal may include a single frequency continuous wave (CW) signal or a frequency modulated continuous wave signal, where frequency modulation modes of the frequency modulated continuous wave signal includes triangular wave, sawtooth wave, code modulation, noise frequency modulation, and the like. In the foregoing embodiments, where the radar signal is a frequency modulated continuous wave signal, the antenna module transmits a frequency modulated continuous wave signal with a changing frequency within a sweep period, a certain frequency difference is generated between the echo signal reflected by an object and the transmitted radar signal, and then, the frequency difference may be measured to obtain distance information and the like between the object and the antenna module.

In some embodiments, the data processing module is disposed on the printed circuit board, and the antenna module performs signal transmission with the data processing module via a flexible cable, where an anisotropic conductive film (ACF) with gold particles of a larger diameter (e.g., more than 10 μm) may be used for bonding, so as to obtain lower signal loss. Alternatively, in some embodiments, the data processing module is disposed on the printed circuit board, and the antenna module is packaged inside the data processing module, where the printed circuit board may be a high frequency circuit board, and the antenna module may be packaged inside the data processing module based on the antenna in package (AiP) technology. In some embodiments, the antenna module is installed inside a terminal device, in which case a hole is defined at a corresponding installation position of the terminal device in view of a sensing area corresponding to the antenna module, and a transmission path is reserved, so as to prevent a metal housing of the terminal device from blocking transmission of millimeter waves.

In some examples, a correspondence between body actions and control instructions is obtained or configured in advance, where a one-to-one correspondence between body actions and control instructions may be established, or a correspondence between body actions and control instructions of a single terminal device may be established, or a correspondence between a single body action and control instructions of different terminal devices may be established.

In some examples, the data processing module and the antenna module form a millimeter wave radar subsystem, and accordingly, the displaying module corresponds to a display subsystem.

In some examples, the displaying module includes a routing gateway unit; the routing gateway unit is configured to receive media data; and accordingly, the displaying module is further configured to display according to the media data received by the routing gateway unit.

In some examples, the displaying module further includes a display, a display drive unit, a chip timing control unit, a signal adaptation unit, and the like, and the media data received by the routing gateway unit is subjected to code stream decoding by the signal adaptation unit, enters the timing control unit for driving control according to a certain timing logic, and form a display effect on the display.

The human-computer interaction apparatus in the embodiments of the present disclosure forms a millimeter wave radar based on the antenna module and the data processing module, implements non-contact control through the millimeter wave radar, determines a corresponding control instruction by capturing and recognizing a body action, and sends the control instruction to a terminal device to enable the terminal device to execute a corresponding command response, thereby implementing interaction operation.

Figure 20:
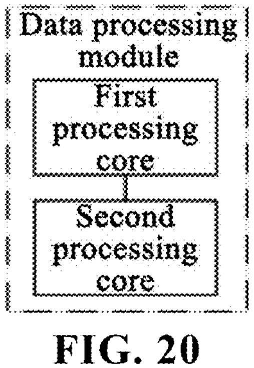
FIG. 20 is a schematic structural diagram of a data processing module according to an embodiment of the present disclosure.

FIG. 20 is a schematic structural diagram of a data processing module according to an embodiment of the present disclosure. As shown in FIG. 20, the data processing module is an embodied optional implementation of the data processing module shown in FIG. 19, and specifically, the data processing module includes: a first processing core and a second processing core.

The first processing core is configured to perform analytic operation according to a signal obtained by mixing the radar signal and the echo signal, to generate reflection object information. The analytic operation includes at least one of one-dimensional fast Fourier transformation (1D FFT), two-dimensional fast Fourier transformation (2D FFT), or angle of arrival (AOA) calculation. The distance information and the speed information can be correspondingly obtained by 1D FFT and 2D FFT, and the angle of arrival information can be correspondingly obtained by the AOA calculation.

In some embodiments, the first processing core is further configured to, prior to the angle of arrival calculation, determine a valid echo signal based on a peak search algorithm and a constant false-alarm rate (CFAR) algorithm.

The second processing core is configured to perform chirp control on the radar signal, pre-train and generate a body action recognition network, recognize the body action by the body action recognition network according to the reflection object information, and determine a corresponding control instruction. The chirp represents a property of the instantaneous frequency of the signal changing with time. In some embodiments, the radar signal is a frequency modulated continuous wave signal, and accordingly, the second processing core is configured to configure a chirp parameter of the frequency modulated continuous wave signal. In some embodiments, the body action recognition network may be independently configured as a gesture recognition network for accurate recognition of gestures. In some embodiments, the body action recognition network is a convolutional neural network which may be based on a Torch architecture, a Pytorch architecture, a VGG architecture, or the like. Due to fewer parameters, a fast determination speed, and high determination accuracy, the convolutional neural network is particularly suitable for image recognition. It should be noted that the recognition network may adopt a convolutional neural network model, or any other neural network model that is suitable for the technical solution of the present application, which is not repeated here.

In some examples, the first processing core may be a DSP processing core, and the second processing core may be an ARM processing core.

Figure 21:
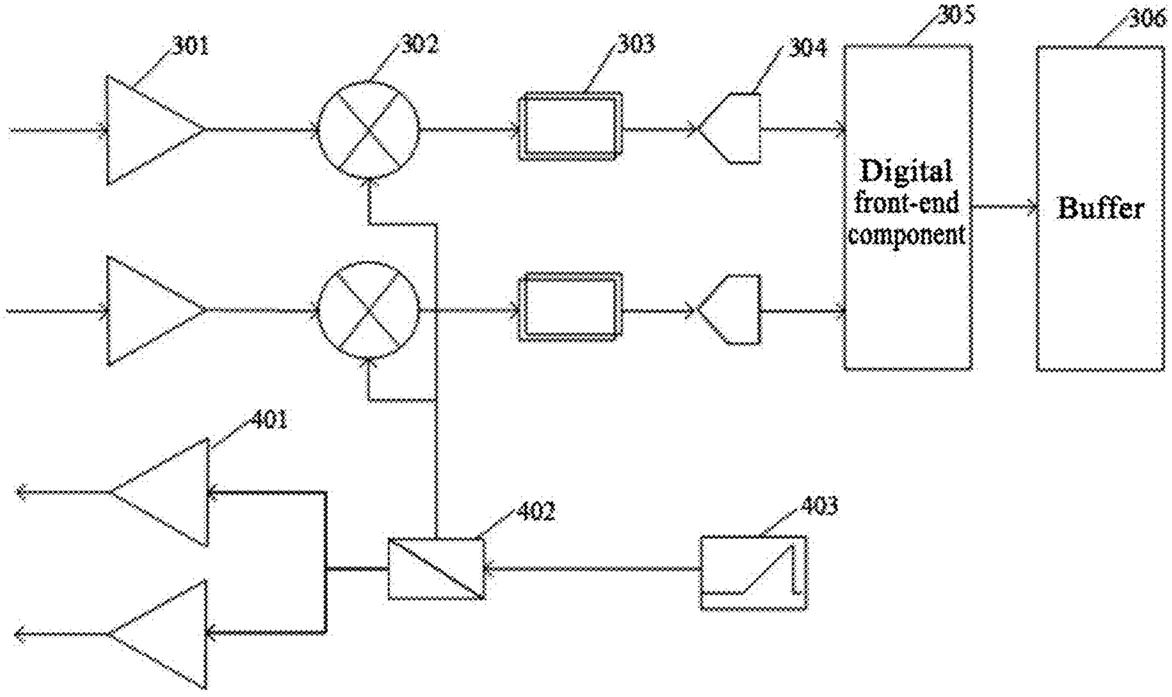
FIG. 21 is a diagram showing an equivalent circuit of another data processing module according to an embodiment of the present disclosure.

FIG. 21 is a diagram showing an equivalent circuit of another data processing module according to an embodiment of the present disclosure. As shown in FIG. 21, the data processing module is an embodied optional implementation of the data processing module shown in FIG. 19, and specifically, the data processing module includes: a low noise amplifier 301, a mixer 302, an intermediate frequency amplifier 303, an analog-to-digital converter 304, a digital front-end component 305 (decimation filter), a buffer 306, a power amplifier 401, a power divider 402, and a waveform generator 403, where the arrows in the figure show the directions of signal transmission.

The low noise amplifier 301, the mixer 302, the intermediate frequency amplifier 303, the analog-to-digital converter 304, the digital front-end component 305 and the buffer 306 are connected in sequence. The waveform generator 403, the power divider 402 and the power amplifier 401 are connected in sequence. An input of the mixer 302 is connected to the low noise amplifier 301 as well as the power divider 402. An input of the low noise amplifier 301 is connected to the antenna module, and an output of the power amplifier 401 is connected to the antenna module. The data processing module may include a plurality of transceiving links. In other words, a plurality of sets (two are exemplarily shown in the figure) of low noise amplifiers 301, mixers 302, intermediate frequency amplifiers 303, and analog-to-digital converters 304 may be correspondingly provided at a receiving side, and a plurality of (two are exemplarily shown in the figure) power amplifiers 401 may be correspondingly provided at a transmitting side. In some embodiments, a phase shifter is further connected between each power amplifier 401 and the corresponding power divider 402. In some embodiments, a filter is further connected between each mixer 302 and the corresponding intermediate frequency amplifier 303.

The waveform generator 403 generates radar signals, one part of which are sent to the mixer 302 through the power divider 402, while the other part of which are sent to the antenna module by the power divider 402 through the power amplifier 401, and sent to the outside by corresponding antenna units in the antenna module. The corresponding antenna units in the antenna module receive echo signals generated by the radar signals encountering an object. Then, the received echo signals are amplified by the low noise amplifier 301, mixed with the part output from the power divider 402 by the mixer 302 to obtain intermediate frequency signals which are converted into corresponding data by the intermediate frequency amplifier 303, the analog-to-digital converter 304 and the digital front-end component 305 and stored in the buffer 306.

Figure 22:
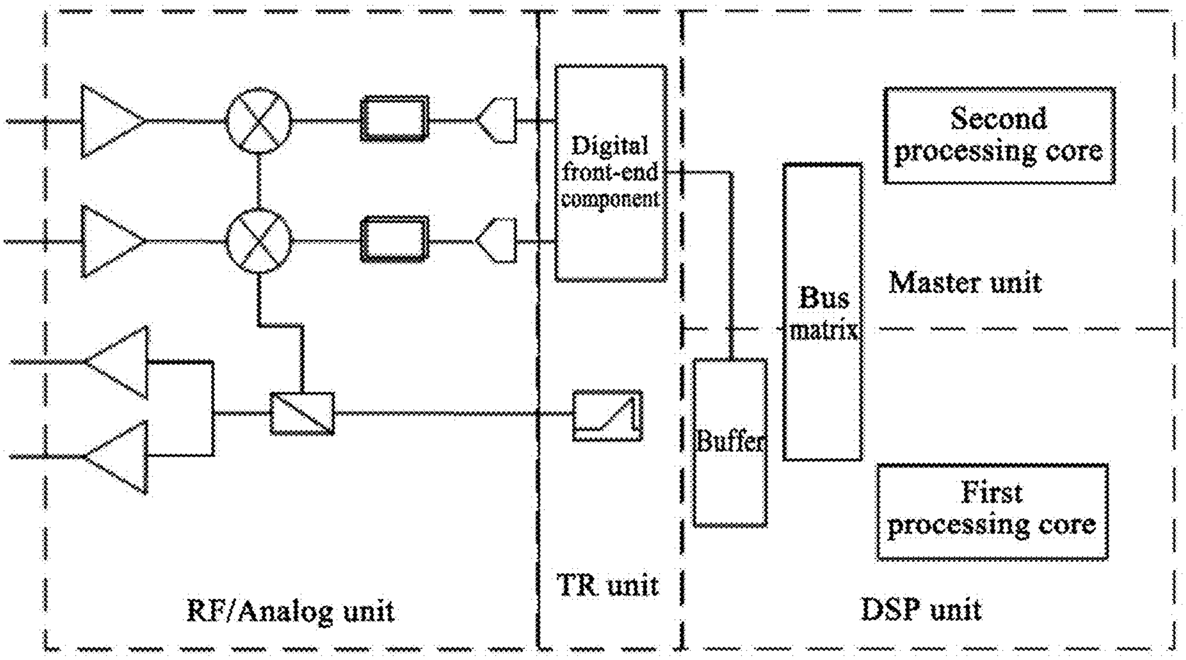
FIG. 22 is a schematic structural diagram of yet another data processing module according to an embodiment of the present disclosure.

FIG. 22 is a schematic structural diagram of yet another data processing module according to an embodiment of the present disclosure. As shown in FIG. 22, the data processing module is an embodied optional implementation based on the data processing module shown in FIGS. 20 and 21, and specifically, the data processing module includes: a low noise amplifier, a mixer, an intermediate frequency amplifier, an analog-to-digital converter, a digital front-end component, a buffer, a power amplifier, a power divider, a waveform generator, a first processing core and a second processing core.

Based on functions of the components, the data processing module may be divided into a plurality of units, including: a radio frequency/analog circuit (RF/Analog) unit, a transmit-receive (TR) unit, a digital signal processing (DSP) unit, and a master unit. As shown in FIG. 22, the RF/Analog unit includes the low noise amplifier, the mixer, the intermediate frequency amplifier, the analog-to-digital converter, the power amplifier, and the power divider; the TR unit includes the digital front-end component and the waveform generator; the DSP unit includes the buffer and the first processing core; and the master unit includes the second processing core. Communication and process control may be performed on each component in the master unit and the DSP unit based on a bus matrix, and a signal transmission direction inside the RF/Analog unit may refer to FIG. 21.

In some examples, the RF/Analog unit further includes a general purpose analog to digital converter (GPADC), an oscillator (OSC), a temperature controller, and the like. The DSP unit further includes a cyclic redundancy check (CRC) component, a direct memory access (DMA) component, a low voltage differential signaling (LVDS) interface, a hardware in the Loop (HIL) component, a radar data memory, and a hardware accelerator connected to the buffer. The master unit further includes a DMA component, a serial peripheral interface (SPI), a quad serial peripheral interface (QSPI), a bus interface, and a debug serial port. A mailbox module based on a mailbox synchronous communication mechanism is further provided between the master unit and the DSP unit.

In some examples, the data processing module may use an IWR6843 chip or a VYYR7301-A0 chip or the like.

In some examples, the data processing module may include only the low noise amplifier, the mixer, the intermediate frequency amplifier, the power amplifier, and the power divider, for example, uses a BGT60TR13 chip or the like, while other components such as the analog-to-digital converter, the digital front-end component, the buffer, and the waveform generator are additionally provided.

Therefore, the data processing module based on the above embodiments can implement processing of corresponding signals and data by a plurality of processing cores, where the first processing core performs a series of analytic operation on the intermediate frequency signal, and the second processing core implements body action recognition through a trainable body action recognition network, thereby increasing the accuracy of body action recognition.

In some examples, the displaying module includes a display in which an antenna module is integrated, and the antenna module includes a reference electrode layer, a dielectric layer, and a radiation electrode layer sequentially arranged in a stack.

In some examples, the reference electrode layer, also called a ground layer, is connected to a ground signal (which may be a DC low-level signal) to lead out static electricity and lightning signals generated in use, so that the antenna is prevented from being damaged due to breakdown to affect the performance of the antenna. The radiation electrode layer, also called a radiation layer, can convert an electrical signal input through the transmission line into an electromagnetic wave signal and radiate the electromagnetic wave signal to the outside, or can convert an external electromagnetic wave signal into an electrical signal and output the electrical signal to a terminal device through the transmission line, thereby enabling wireless signal transmission. The dielectric layer may be a dielectric substrate between the reference electrode layer and the radiation electrode layer, which may be made of a low-loss dielectric material and play a role in supporting the reference electrode layer and the radiation electrode layer. In some embodiments, the integration manner of the antenna module in the display may include in-screen integration, off-screen integration, or the like, and the in-screen integration may further include on-screen integration, under-screen integration, or the like.

The human-computer interaction apparatus in the embodiments of the present disclosure includes a smart home device, a vehicle-mounted device, a health monitoring device, a consumer electronic device or any other field that needs to be monitored and interactively sensed across separated places.

The human-computer interaction apparatus provided in the embodiments of the present disclosure is described in detail below in conjunction with practical applications. Taking the application to a smart home scenario as an example, the human-computer interaction apparatus corresponds to various types of smart home devices, and one or more smart home devices may be controlled in a non-contact manner by the interaction apparatus provided in the embodiments of the present disclosure. The terminal device may include: a household television, an air conditioner, an electric lamp, an electronic curtain, a water heater, a range hood, a smart stove, a refrigerator, sound equipment, an electronic door, or the like. The human-computer interaction apparatus, which may be set independently or in the corresponding terminal device, can establish a one-to-one control, one-to-many control or many-to-one control relation with various terminal devices.

The case where the terminal device is a range hood, and the human-computer interaction apparatus is arranged in the range hood for one-to-one control is taken as an example for illustration.

The human-computer interaction apparatus includes an antenna module, a data processing module, and a displaying module. A transmitting element in the antenna module is configured to transmit a radar signal, and a receiving element is configured to receive a reflected echo signal. Specifically, the radar signal is a frequency modulated continuous wave signal. The data processing module includes a low noise amplifier, a mixer, an intermediate frequency amplifier, an analog-to-digital converter, a digital front-end component, a buffer, a power amplifier, a power divider, a waveform generator, a first processing core and a second processing core. The displaying module is configured to display the determined body action and/or control instruction, and display an interactive interface of the range hood. The human-computer interaction apparatus and the range hood share the displaying module, and the antenna module is integrated in a display of the displaying module in a manner including in-screen integration, off-screen integration, or the like, where the in-screen integration further includes on-screen integration, under-screen integration, or the like.

Firstly, the waveform generator in the data processing module generates radar signals which are transmitted to the mixer and the power amplifier through the power divider, and after being processed by the power amplifier, the signals are transmitted to the antenna module to be transmitted to the outside. The low noise amplifier receives echo signals received by the antenna module, the frequency mixer mixes the radar signals with the echo signals, and then, the mixed signals are processed by the intermediate frequency amplifier, the analog-to-digital converter and the digital front-end component to generate corresponding data which is stored in the buffer. The first processing core performs analytic operation on the data, including one-dimensional fast Fourier transformation, two-dimensional fast Fourier transformation, or angle of arrival calculation or the like, to generate reflection object information. The second processing core recognizes a gesture by a pre-trained gesture recognition network based on the reflection object information, determines an expected control instruction to the range hood from a user, and sends the control instruction to the range hood through a corresponding interface. The range hood executes a corresponding action. Specifically, for example, when a gesture of staying in a defined sensing area for more than 3 seconds is detected, the range hood is started, when a gesture of clockwise or counter-clockwise rotation is detected, a wind magnitude of the range hood is adjusted, and when a gesture of left-right waving is detected, a display interface is controlled to turn a page, etc.

It will be appreciated that the above implementations are merely exemplary implementations for the purpose of illustrating the principle of the present disclosure, and the present disclosure is not limited thereto. It will be apparent to those skilled in the art that various modifications and variations may be made without departing from the spirit or essence of the present disclosure. Such modifications and variations should also be considered as falling into the protection scope of the present disclosure.

What is claimed is:

1. A display apparatus, comprising a display module and an antenna module, wherein the display module comprises a display area and an edge area; the antenna module comprises a plurality of antenna units comprising a plurality of radiation structures and a plurality of transmission lines; the radiation structures are integrated on the display module; the radiation structures on a same side of the display area are divided into a plurality of groups arranged side by side in a second direction, and each group comprises multiple radiation structures arranged side by side in a first direction; the radiation structures in adjacent groups are staggered; and each of the radiation structures is connected to one of the transmission lines; wherein the transmission lines are configured such that electromagnetic waves fed into the radiation structures have a same phase.

2. The display apparatus according to claim 1, wherein the transmission lines are integrated on the display module, and the transmission lines have a same length.

3. The display apparatus according to claim 1, wherein the transmission lines are integrated on the display module, the radiation structures comprise two groups, one group closer to the display area is called a first radiation structure group, and the other group is called a second radiation structure group;

the transmission lines connected to the radiation structures in the first radiation group are called first transmission lines, each first transmission line comprises a first line segment and a second line segment connected with each other, and the first line segment is connected to the corresponding radiation structure; and the first line segment extends in the second direction;

the transmission lines connected to the radiation structures in the second radiation group are called second transmission lines, and each second transmission line comprises at least one third line segment extending in the first direction, and at least one fourth line segment extending in the second direction;

a length of the first line segment in the first transmission line is equal to a summed length of the third line segment in the second transmission line; and a length of the second line segment in the first transmission line is equal to a summed length of the fourth line segment in the second transmission line.

4. The display apparatus according to claim 3, wherein the number of third line segments and/or the number of fourth line segments differ in at least part of the second transmission lines.

5. The display apparatus according to claim 3, wherein every two adjacent second transmission lines are arranged in mirror symmetry.

6. The display apparatus according to claim 3, wherein the first transmission lines have a same trace direction.

7. The display apparatus according to claim 3, wherein the second line segment comprises a first line subsegment extending in the first direction, and a second line subsegment extending in the second direction.

8. The display apparatus according to claim 1, wherein the transmission lines are integrated on the display module, the radiation structures comprise two groups, one group closer to the display area is called a first radiation structure group, and the other group is called a second radiation structure group; and the transmission lines connected to the radiation structures in the first radiation group are called first transmission lines, the transmission lines connected to the radiation structures in the second radiation group are called second transmission lines, and the first transmission lines and the second transmission lines have opposite feed directions.

9. The display apparatus according to claim 1, wherein each of the radiation structures and the transmission line connected thereto form an integral structure.

10. The display apparatus according to claim 1, wherein the antenna module further comprises an adapter plate and a printed circuit board; each transmission line comprises a first portion integrated on the display module, a second portion integrated on the adapter plate, and a third portion integrated on the printed circuit board; and the first portion of the transmission line is connected to the second portion by bonding, and the second portion is connected to the third portion by bonding.

11. The display apparatus according to claim 10, wherein the radiation structures comprise two groups, one group closer to the display area is called a first radiation structure group, and the other group is called a second radiation structure group; the transmission lines connected to the radiation structures in the second radiation group are called first transmission lines, the transmission lines connected to the radiation structures in the first radiation group are called second transmission lines; and the second portion of each second transmission line comprises a plurality of fifth line segments extending in the first direction, and a plurality of sixth line segments extending in the second direction; and the plurality of fifth line segments and the plurality of sixth line segments are alternately and sequentially connected.

12. The display apparatus according to claim 10, wherein the radiation structures comprise two groups, one group closer to the display area is called a first radiation structure group, and the other group is called a second radiation structure group; the transmission lines connected to the radiation structures in the second radiation group are called first transmission lines, the transmission lines connected to the radiation structures in the first radiation group are called second transmission lines; and the third portion of each first transmission line has a different length from the third portion of each second transmission line.

13. The display apparatus according to claim 1, wherein each of the radiation structures comprises a plurality of radiation patches connected with each other and arranged side by side in the first direction.

14. The display apparatus according to claim 1, wherein each of the radiation structures comprises a plurality of radiation patches connected with each other and arranged side by side in the second direction.

15. The display apparatus according to claim 1, wherein each of the radiation structures comprises a plurality of radiation patches connected with each other; and the radiation patches in respective radiation structures are divided into a plurality of groups arranged side by side in the second direction, each of which comprises multiple radiation patches arranged side by side in the first direction, and the radiation patches in adjacent groups are staggered.

16. The display apparatus according to claim 1, wherein the antenna module comprises a radiation layer, the radiation layer covers the display module and comprises a mesh structure, and the radiation structures are in the radiation layer.

17. A human-computer interaction apparatus, comprising the display apparatus according to claim 1, wherein the display module comprises a data processing module and a displaying module;

the data processing module is configured to determine, according to a radar signal transmitted from the antenna module and a received echo signal, a body action and a corresponding control instruction, and output the control instruction; and the displaying module is configured to display the body action and/or the control instruction determined by the data processing module.

18. The human-computer interaction apparatus according to claim 17, wherein the data processing module comprises a first processing core and a second processing core;

the first processing core is configured to perform analytic operation according to a signal obtained by mixing the radar signal and the echo signal, to generate reflection object information, wherein the analytic operation comprises at least one of one-dimensional fast Fourier transformation, two-dimensional fast Fourier transformation, or angle of arrival calculation; and the second processing core is configured to perform chirp control on the radar signal, pre-train and generate a body action recognition network, recognize the body action by the body action recognition network according to the reflection object information, and determine the corresponding control instruction.

19. The human-computer interaction apparatus according to claim 17, wherein the data processing module comprises a low noise amplifier, a mixer, an intermediate frequency amplifier, an analog-to-digital converter, a digital front-end component, a buffer, a power amplifier, a power divider, and a waveform generator;

wherein the low noise amplifier, the mixer, the intermediate frequency amplifier, the analog-to-digital converter, the digital front-end component and the buffer are connected in sequence;

the waveform generator, the power divider and the power amplifier are connected in sequence; and an input of the mixer is further connected to the power divider, an input of the low noise amplifier is connected to the antenna module, and an output of the power amplifier is connected to the antenna module.

20. The human-computer interaction apparatus according to claim 19, wherein the human-computer interaction apparatus comprises any one of a smart home device, a vehicle-mounted device, a health monitoring device, or a consumer electronic device.

* * * * *